US012573078B2

(12) United States Patent
Jang et al.

(10) Patent No.: US 12,573,078 B2
(45) Date of Patent: Mar. 10, 2026

(54) METHOD AND APPARATUS FOR DETERMINING VEHICLE LOCATION BASED ON OPTICAL CAMERA COMMUNICATION

(71) Applicant: Kookmin University Industry Academy Cooperation Foundation, Seoul (KR)

(72) Inventors: Yeong Min Jang, Seoul (KR); Md Osman Ali, Seoul (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 347 days.

(21) Appl. No.: 17/539,054

(22) Filed: Nov. 30, 2021

(65) Prior Publication Data

US 2022/0270285 A1 Aug. 25, 2022

(30) Foreign Application Priority Data

Feb. 23, 2021 (KR) ......................... 10-2021-0024190

(51) Int. Cl.
*G06T 7/73* (2017.01)
*G06T 7/246* (2017.01)
(Continued)

(52) U.S. Cl.
CPC ................ *G06T 7/73* (2017.01); *G06T 7/246* (2017.01); *G06T 7/536* (2017.01); *G06T 7/60* (2013.01);
(Continued)

(58) Field of Classification Search
CPC .......... G06T 7/73; G06T 7/246; G06T 7/536; G06T 7/60; G06T 2207/20084;
(Continued)

(56) References Cited

U.S. PATENT DOCUMENTS

2009/0240432 A1* 9/2009 Osanai ................. G06V 20/584
701/300
2013/0083195 A1* 4/2013 Remillard .............. H04N 23/56
348/148
(Continued)

FOREIGN PATENT DOCUMENTS

JP 2020126626 A 8/2020
KR 101689252 B1 12/2016
(Continued)

OTHER PUBLICATIONS

Takai, Isamu, et al. "Optical vehicle-to-vehicle communication system using LED transmitter and camera receiver." IEEE photonics journal 6.5 (2014): 1-14. (Year: 2014).*
(Continued)

*Primary Examiner* — Faris S Almatrahi
*Assistant Examiner* — Dana F Artimez
(74) *Attorney, Agent, or Firm* — Berkeley Law & Technology Group, LLP

(57) ABSTRACT

The method for determining a vehicle location based on OCC includes receiving information on a distance between a plurality of rear lamps of a front vehicle and size information of the plurality of rear lamps by using a single camera provided in a vehicle, acquiring a rear side image of the front vehicle through the single camera, determining a rear lamp area in the rear side image of the front vehicle by using a pre-trained artificial neural network, determining a driving lane of the front vehicle based on the rear lamp area, determining a distance between the single camera and each of the plurality of rear lamps based on the rear lamp area, and deriving location information of the front vehicle, based on the information described above.

16 Claims, 8 Drawing Sheets

(51) Int. Cl.

| | |
|---|---|
| *G06T 7/536* | (2017.01) |
| *G06T 7/60* | (2017.01) |
| *G06V 10/82* | (2022.01) |
| *G06V 20/58* | (2022.01) |
| *G08G 1/04* | (2006.01) |
| *G08G 1/16* | (2006.01) |

(52) U.S. Cl.
CPC ............ *G06V 10/82* (2022.01); *G06V 20/584* (2022.01); *G08G 1/04* (2013.01); *G08G 1/161* (2013.01); *G06T 2207/20084* (2013.01); *G06T 2207/30256* (2013.01); *G06V 2201/08* (2022.01)

(58) Field of Classification Search
CPC . G06T 2207/30256; G06T 2207/10016; G06T 2207/30261; G06V 10/82; G06V 20/584; G06V 2201/08; G08G 1/04; G08G 1/161
See application file for complete search history.

(56) References Cited

U.S. PATENT DOCUMENTS

| | | | | |
|---|---|---|---|---|
| 2015/0088373 A1* | 3/2015 | Wilkins | ............... | G05D 1/0293 701/36 |
| 2018/0081371 A1* | 3/2018 | Bar-Tal | ................ | G05D 1/0088 |
| 2018/0144202 A1* | 5/2018 | Moosaei | .............. | G06V 20/584 |
| 2019/0156132 A1* | 5/2019 | Moosaei | ................ | G06V 10/82 |

FOREIGN PATENT DOCUMENTS

| | | | |
|---|---|---|---|
| KR | 101809088 B1 | 12/2017 | |
| KR | 101979928 B1 | 5/2019 | |
| KR | 101971370 B1 | 8/2019 | |

OTHER PUBLICATIONS

Hossan, Md. Tanvir, Chowdhury, Mostafa Zaman, Hasan, Moh. Khalid, Shahjalal, Md., Nguyen, Trang, Le, Nam Tuan, Jang, Yeong Min, A New Vehicle Localization Scheme Based on Combined Optical Camera Communication and Photogrammetry, Mobile Information Systems, 2018, 8501898, 14 pages, 2018. (Year: 2018).*

Tanvir Hossan "Localization using Optical Camera Communication and Photogrammetry for Wireless Networking Applications" submitted on Aug. 23, 2019. [online], [retrieved on Jan. 14, 2025], retrieved from the Internet <URL: https://doi.org/10.48550/arXiv.1908.08892> (Year: 2019).*

Islam, Amirul. "Convolutional Neural Network-based Optical Camera Communication System for Internet of Vehicles." arXiv preprint arXiv:1911.09529 (2019). (Year: 2019).*

* cited by examiner

[FIG. 1]
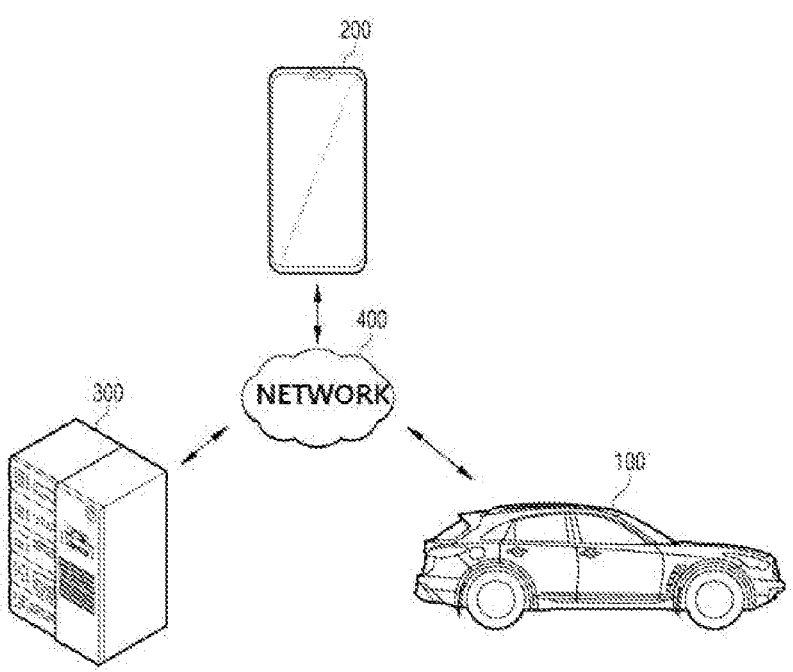
[FIG. 2]
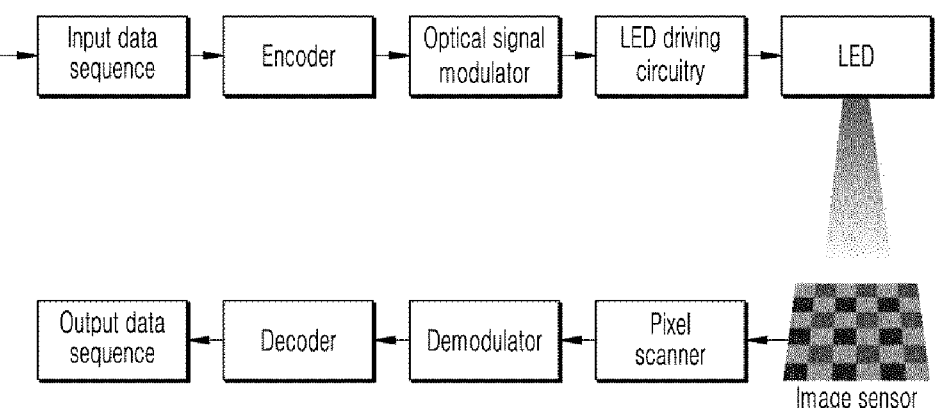

[FIG. 3A]
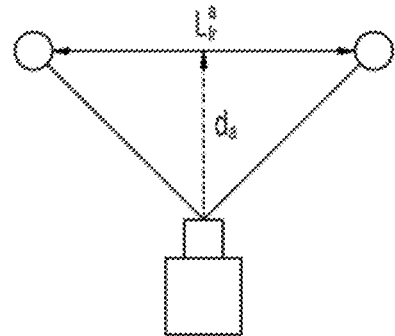
[FIG. 3B]
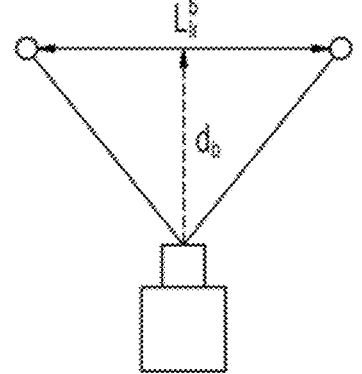
[FIG. 3C]
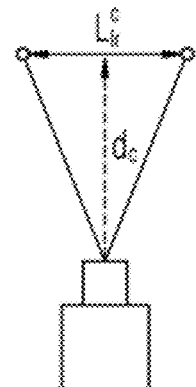

[FIG. 4]
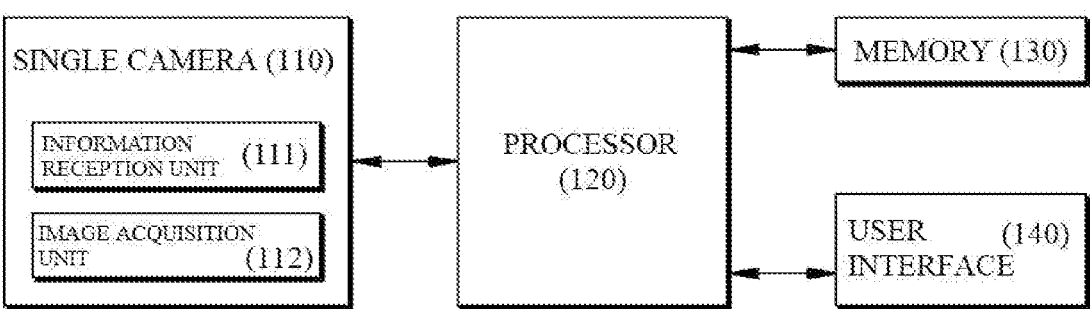
[FIG. 5]
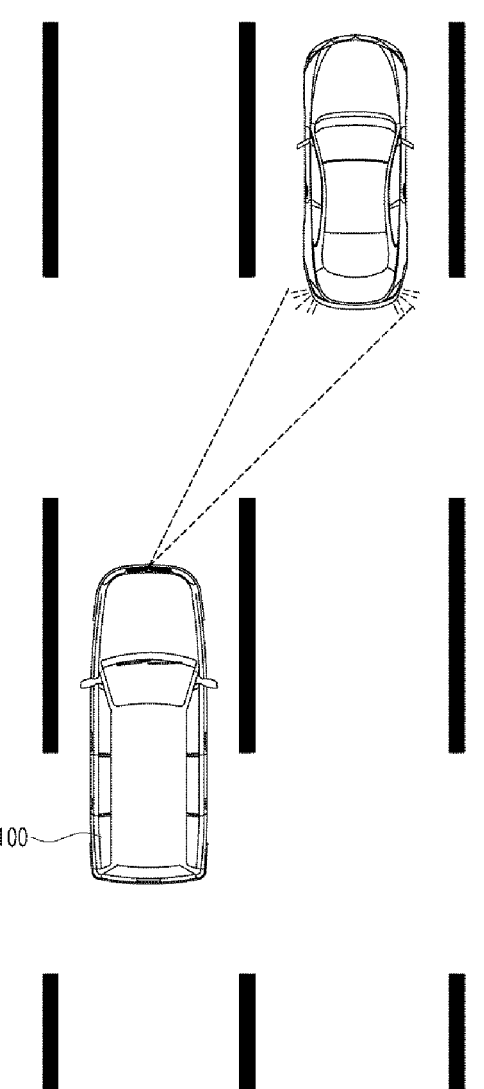

[FIG. 6A]
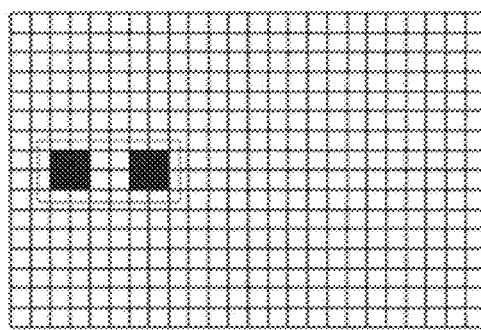
[FIG. 6B]
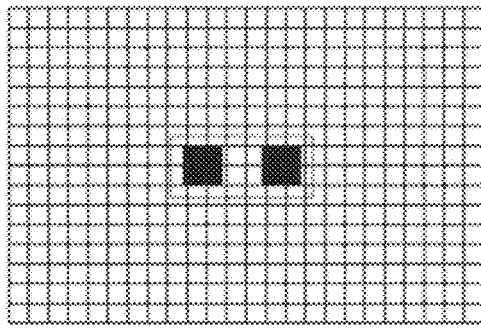
[FIG. 6C]
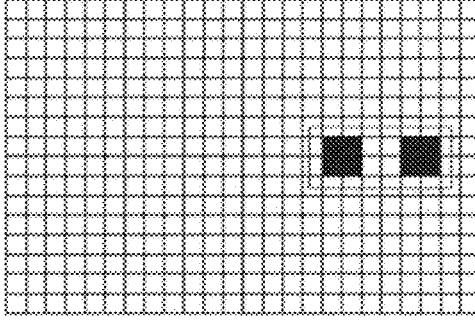

[FIG. 7]
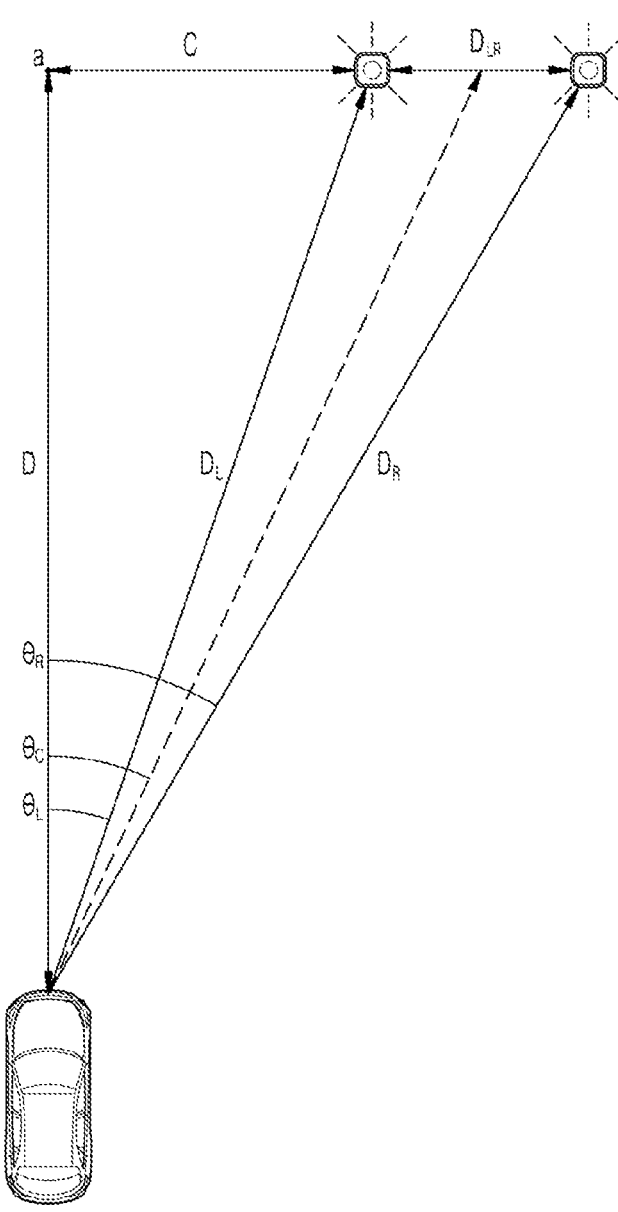

[FIG. 8A]
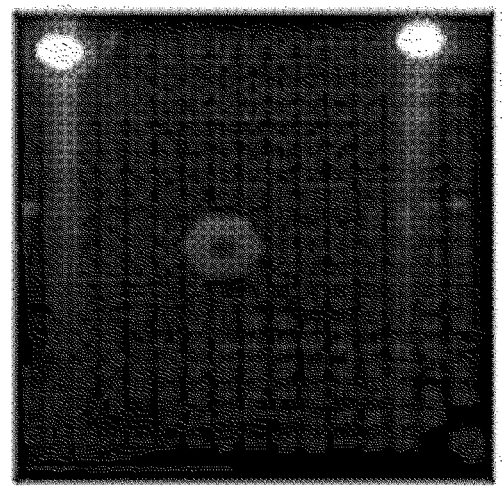
[FIG. 8B]
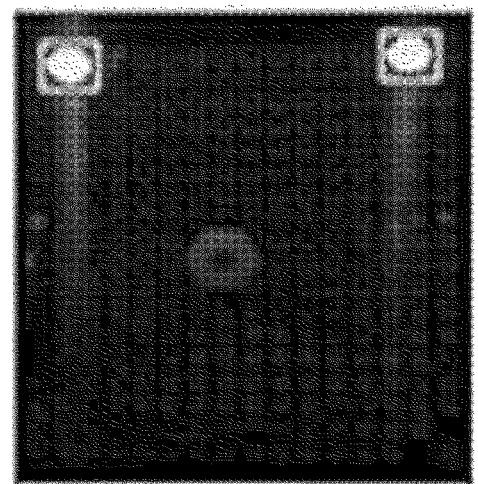

[FIG. 8C]
[FIG. 8D]
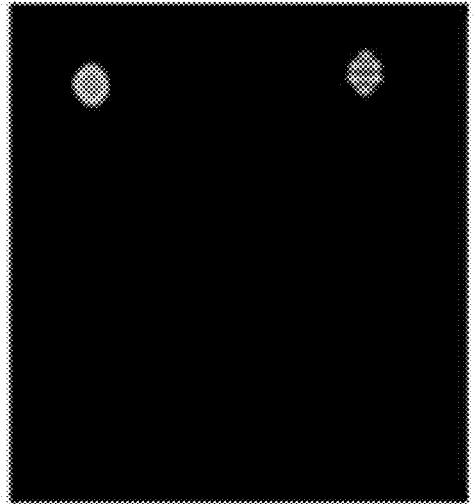

[FIG. 9]
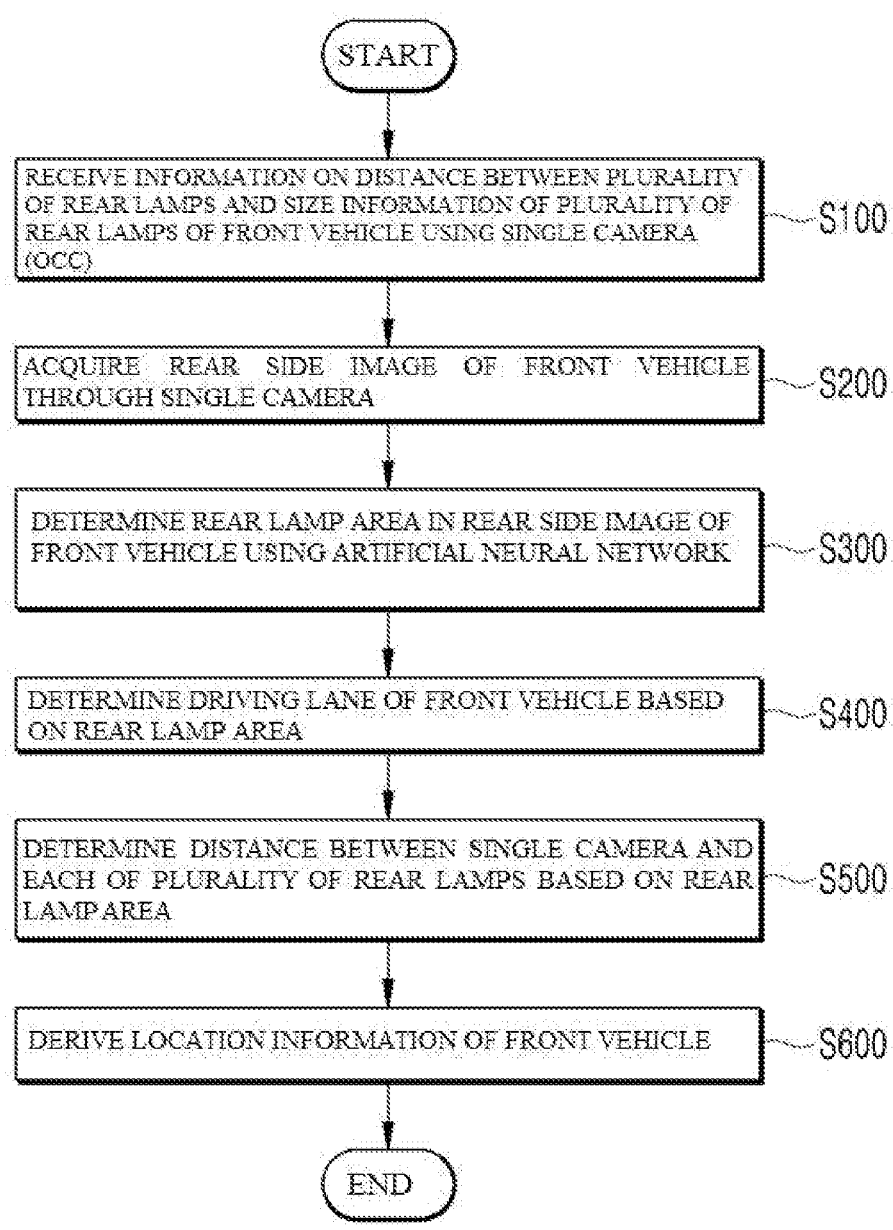

METHOD AND APPARATUS FOR DETERMINING VEHICLE LOCATION BASED ON OPTICAL CAMERA COMMUNICATION

CROSS-REFERENCE TO RELATED APPLICATION

This present application claims the benefit of priority to Korean Patent Application No. 10-2021-0024190, entitled "METHOD AND APPARATUS FOR DETERMINING VEHICLE LOCATION BASED ON OPTICAL CAMERA COMMUNICATION," filed on Feb. 23, 2021, in the Korean Intellectual Property Office, the entire disclosure of which is incorporated herein by reference.

FIELD

The present disclosure relates to a method and an apparatus for determining a vehicle location so as to determine a location of a front vehicle based on data received from a plurality of rear lamps of the front vehicle, by using a single camera photographing the front vehicle as an optical camera communication (OCC)-based receiver.

BACKGROUND

In general, wireless communication is advantageous in terms of cost, practicality, and operational aspects, but a bottleneck phenomenon occurs. In addition, a radio frequency (RF) band under a 10 GHz frequency part has been widely used in wireless communication, but does not satisfy the capacity and speed required in bandwidth. In addition, as various technologies simultaneously share the same frequency band (Wi-Fi, Bluetooth, mobile communication network, wireless telephone), research has been actively conducted to solve the bottleneck problem that occurs in wireless communication.

As a result, in recent years, many wireless applications based on RF technology are being replaced with optical wireless technology. Among the technologies, visible light communication (VLC) has been already established, which is a technology for providing a high data rate using a visible light spectrum (400 THz to 790 THz) and using modified optical signals of LED and LD.

Meanwhile, optical camera communication (OCC) technology is a technology being developed and standardized, and may be referred to as a technology of directly receiving visible light data by an image sensor of a smartphone camera, a vehicle camera, or the like, without a separate receiver. OCC technology is one among promising new technologies that are part of an optical wireless communication (OWC) product line. Here, the OWC technology is characterized in that an unauthorized spectrum is used as a communication medium to solve the bottleneck phenomenon, use of frequency use permission is not necessary, and it is easy to maintain security with the straightness of the propagation and low object permeability.

In OCC, light introduced at other angles may be projected at various positions of an image sensor plane. That is, since it is capable of separating light in different sources and directions through this feature, OCC is an ideal technique for spatial division multiplexing and multiple input and multiple-output (MIMO) system imaging.

In particular, OCC is one of the most promising candidates of vehicle communication. For example, for OCC, a light such as a rear lamp of a vehicle may be used as a transmitter, and a camera provided in the vehicle may be used as a receiver. That is, the front and rear LEDs of the vehicle may be used as an OCC transmitter capable of transmitting a vehicle state or other information to other vehicles, and a camera receiver may receive data by decoding data in an image capturing the front and rear LEDs of the vehicle.

OCC-based vehicle communication is disclosed in Related Art 1. However, in a conventional OCC-based vehicle communication technology such as in Related Art 1, when the data is received from the front vehicle, two cameras provided in the vehicle are used, or the location of the front vehicle is predicted by using one camera and a radar provided in the vehicle. In this case, there are problems that the computation for predicting the vehicle location may be more complicated, the vehicle structure may be complicated, and the weight of the vehicle may be increased.

The background art described above is technical information retained by the present inventors in order to derive the present disclosure or acquired by the present inventors in the process of deriving the present disclosure, and thus is not necessarily known art disclosed to the general public before the filing of the present application.

PRIOR ART DOCUMENT

[Patent Document]
(Patent Document 1) Korean Patent Registration No. 10-1689252 (2016.12.19)

SUMMARY

An aspect of the present disclosure is to improve the accuracy and efficiency of determination of a vehicle location, by calculating a distance and an angular distance from a following vehicle to the followed vehicle by using an OCC system that uses a single camera as a receiver and a plurality of rear lamps of the vehicle as a transmitter.

Another aspect of the present disclosure is to improve the accuracy of detection of a rear lamp area and the accuracy of a location determination of a front vehicle and maintain a safe following distance from the front vehicle, by determining the rear lamp area of the front vehicle using an artificial neural network.

Yet another aspect of the present disclosure is to simplify the computational complexity of the location determination of the front vehicle and simplify an equipment structure of the vehicle so as to allow the vehicle to be more lightweight, by determining the location of the front vehicle using only a single camera.

Still another aspect of the present disclosure is to provide highly stable communication for real-time connection and safety by providing an optical camera communication (OCC) device-based system that is applicable to vehicle communication.

Aspects of the present disclosure are not limited to the above-mentioned aspects, and other aspects and advantages of the present disclosure, which are not mentioned, will be understood through the following description, and will be apparent from the embodiments of the present disclosure. In addition, it will be appreciated that the aspects and advantages of the present disclosure will be easily realized by those skilled in the art based on the appended claims and combinations thereof.

According to an embodiment of the present disclosure, a method for determining a vehicle location based on optical camera communication (OCC) may include determining a location of a front vehicle based on data received from a plurality of rear lamps of the front vehicle by using a single camera photographing the front vehicle as an OCC-based receiver.

Specifically, according to an embodiment of the present disclosure, the method for determining a vehicle location based on OCC may include the steps of: receiving information on a distance between a plurality of rear lamps of a front vehicle and size information of the plurality of rear lamps by using a single camera provided in a vehicle: acquiring a rear side image of the front vehicle through the single camera: determining a rear lamp area in the rear side image of the front vehicle by using a pre-trained artificial neural network: determining a driving lane of the front vehicle based on the rear lamp area: determining a distance between the single camera and each of the plurality of rear lamps based on the rear lamp area; and deriving location information of the front vehicle based on the received information on the distance between the plurality of rear lamps, the size information, the distance between the single camera and each of the plurality of rear lamps, and the driving lane.

Through the method for determining the vehicle location based on OCC according to an embodiment of the present disclosure, it is possible to maintain a safe following distance from a front vehicle and prevent accidents through more accurate and efficient vehicle location determination, by calculating a distance and an angular location from a following vehicle to the followed vehicle by using an OCC system that uses a single camera.

In addition, other methods and systems for implementing the present disclosure, and computer-readable recording media in which computer programs for implementing the method are stored, may be further provided.

Other aspects, features, and advantages than those described above will become apparent from the following drawings, the appended claims, and the detailed description of the present disclosure.

According to the embodiments of the present disclosure, it is possible to maintain a safe following distance from a front vehicle and prevent accidents through more accurate and efficient location determination of the vehicle, by calculating a distance and an angular distance from a following vehicle to the followed vehicle by using an OCC system that uses a single camera as a receiver and a plurality of rear lamps as a transmitter.

In addition, it is possible to reduce the computational complexity of the location determination of a front vehicle and simplify an equipment structure of the vehicle by determining the location of the front vehicle using only a single camera, without detecting the location of the front vehicle through a plurality of cameras or one camera and an additional sensor.

In addition, it is possible to improve user satisfaction by reducing the computational complexity of the location determination of the front vehicle and simplifying the equipment structure of the vehicle so as to lighten the vehicle.

Further, it is possible to improve product reliability by determining the rear lamp area of the front vehicle using an artificial neural network to improve the accuracy of the detection of the rear lamp area and the accuracy of the location determination of the front vehicle.

The effects of the present disclosure are not limited to those mentioned above, and other effects not mentioned may be clearly understood to those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which:

FIG. 1 is a schematic exemplary diagram of a system for determining a vehicle location based on optical camera communication (OCC) according to an embodiment of the present disclosure;

FIG. 2 is a diagram for describing a basic operation principle of OCC according to an embodiment of the present disclosure;

FIG. 3 is a diagram schematically illustrating a change in size of a rear lamp of a front vehicle according to a distance between the vehicles in an apparatus for determining a vehicle location according to an embodiment of the present disclosure:

FIG. 4 is a block diagram schematically illustrating an apparatus for determining a vehicle location according to an embodiment of the present disclosure:

FIG. 5 is an exemplary diagram for describing an apparatus for determining a vehicle location according to an embodiment of the present disclosure:

FIG. 6 is an exemplary diagram for describing coordination setting in the apparatus for determining the vehicle location according to an embodiment of the present disclosure: FIG. 7 is an exemplary diagram for describing a process of deriving location information in the apparatus for determining the vehicle location according to an embodiment of the present disclosure:

FIG. 8 is an exemplary diagram illustrating shapes of rear lamps of the front vehicle of the apparatus for determining the vehicle location according to an embodiment of the present disclosure; and FIG. 9 is a flowchart for describing a method for determining a vehicle location according to an embodiment of the present disclosure.

DETAILED DESCRIPTION

Advantages and features of the present disclosure and methods for achieving them will become apparent from the descriptions of aspects herein below with reference to the accompanying drawings.

However, the present disclosure is not limited to the embodiments disclosed herein but may be implemented in various different forms. The embodiments are provided to make the description of the present disclosure thorough and to fully convey the scope of the present disclosure to those skilled in the art. It is to be noted that the scope of the present disclosure is defined only by the claims. In relation to describing the present disclosure, when the detailed description of the relevant known technology is determined to unnecessarily obscure the gist of the present disclosure, the detailed description may be omitted.

The terminology used herein is for the purpose of describing particular embodiments only and is not intended to be limiting. As used herein, the singular forms "a." "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Hereinafter, embodiments according to the present disclosure will be described in detail with reference to the accompanying drawings, and in the explanation of the accompanying drawings, the same or corresponding components are denoted by the same reference numerals and a duplicated description thereof will be omitted.

FIG. 1 is a schematic exemplary diagram of a system for determining a vehicle location based on optical camera communication (OCC) according to an embodiment of the present disclosure and FIG. 2 is a diagram for describing a basic operation principle of OCC according to an embodiment of the present disclosure.

Referring to FIG. 1, a system for determining a vehicle location based on OCC according to an embodiment of the present disclosure is based on OCC technology, wherein OCC is applied to vehicle communication. The OCC uses a light source such as an LED as a transmitter and a camera as a receiver, and a light of the vehicle, which is the light source, may be modulated in a flicker free manner that may not be detected by a person's eye. That is, the lights located at the front and rear sides of the vehicle may be used as an OCC transmitter capable of transmitting a vehicle state or other information to other vehicles, and a camera receiver may decode data in an image in which the lights are captured, so as to identify information transmitted from the lights.

In the present embodiment, if a distance between two rear lamps of the front vehicle is transmitted using OCC, it is possible to calculate a distance and an angular location of the front vehicle from the next vehicle by using one camera. Further, in the present embodiment, the shapes of the rear lamps of the front vehicle are compared so as to detect a road curving direction in the image captured from a camera receiver of a following vehicle. As a result, in the present embodiment, it is possible to maintain a safe following distance from the front vehicle, and prevent accidents by recognizing in advance a curved road ahead.

When the technology of the present embodiment is applied, the data may be received without radio frequency (RF) technology at a data rate of 1 kbps or more, in which a communication distance is up to 20 m, an error rate is low, and a real-time vehicle information collection service may be supported.

Here, OCC is a technology for receiving data bits transmitted from the light source using a camera image sensor, and has been researched as a promising technology having a significant number of advantages in infrastructure where smartphones and the like in which an LED light and a camera are embedded are used in most spaces. In addition, OCC may provide high-performance characteristics including excellent signal to interference+noise ratio (SINR), high security, low interference, and high stability for various communication distances.

Since various types of receivers may be used in OCC, OCC is different from visible light communication (VLC) and light fidelity (LiFi), and in VLC and LiFi, a photo diode (PD) is used only for data reception. In an (OCC) system, a general camera consisting of lenses and two-dimensional image sensors, without a need to modify hardware to support communication purposes, is advantageous in communication, since light is more spatially separated from an existing lens compared to a photo diode, and the camera may demodulate various light sources which are simultaneously spatially separated with high image resolution.

A shutter mechanism of the camera receiver may determine a pixel exposure of the image, and according to the shutter mechanism, the camera may be classified as a global or rolling shutter rating. A rolling shutter camera, which sequentially exposes a pixel row to light, should be sampled as fast as possible to detect an intensity change in light modulated in the rolling image. A global shutter camera, which simultaneously exposes all pixels, requires a frame rate sufficiently fast to detect a brightness change of each LED in a continuous image.

On the other hand, since the main purpose of the light source is lighting, and communication is secondary, the light source and its modulation need to be appropriately selected. Modulation schemes include pulse-based transmission, and the pulse-based transmission may include a modulation technique in which data is encoded with pulse waves rather than sine waves. Further, the pulse-based transmission modulation may be implemented by a DC converter with single high power, high efficiency, and a slow response, and an additional power switch that operates at a fast speed, to transmit a current to an LED at a determined moment. If an average value varies depending on a pulse width of a data signal, the same switch that operates the data transmission provides dimming control to significantly simplify the DC converter. Dimmable modulation may include modulation techniques such as On-Off keying (OOK), variable pulse position modulation (VPPM), and color shift keying (CSK).

Referring to FIG. 2, regarding the basic operation principle of OCC, the OCC system may include an OCC transmitter and an OCC receiver.

The OCC transmitter may be implemented by a light such as a rear lamp of the vehicle in the present embodiment, and may include an encoder, an optical signal modulator, an LED driving circuitry, and a light source (LED) as illustrated in FIG. 2.

The OCC transmitter may code an input data sequence to be transmitted in the OCC system. Such coding may be implemented by various methods. For example, the encoder may make data to be transmitted of 1 correspond to "on" of the light source, and make data of 0 correspond to "off" of the light source. This example may be differently configured depending on a pulse frequency of the light source. For example, data of 1 may be made to correspond to "on-on" of the light source, and data of 0 may be made to correspond to "off-off" of the light source.

As such, in the present embodiment, the OCC transmitter may match the on/off state of the light source corresponding to the data with each other so as to allow data to be transmitted through the on/off of the light source later. In the present embodiment, the OCC transmitter may encode data using, for example, a Manchester coding technique, a 4B6B coding technique, and the like.

Further, in the present embodiment, an optical signal modulator may configure the coded data as data symbols, and generate a data packet including the data symbols. Such a data packet may be configured by continuously arranging data consisting of digital bits 1 and 0.

Further, the LED driving circuitry may drive the light source according to the coded data. For example, the light source may be turned on and off according to bits 1 and 0 of the data. Such an LED driving circuitry may allow the light source to be turned on/off according to a predetermined pulse frequency. As such, it is possible to output the data to be transmitted through the on/off control of the light source in the LED driving circuitry.

That is, the light source serves as a transmitter in the OCC system. The light source may be a light emitting diode (LED), and may be provided with at least one light source. Such a light source may be turned on or off at a predetermined pulse frequency by the LED driving circuitry according to the coded data as described above. In accordance with the present embodiment, a plurality of light sources may be provided, and may be arranged in 1×N, arranged in M×1, and arranged in M×N. Naturally, the light sources may be arranged in various forms such as circular, radial, and elliptical shapes. If the pulse frequency at which the light source is turned on/off is 110 times or more per second, on/off of the light source is not distinguished by the human eye, and is recognized as a continuous "on" state. These pulse frequencies may naturally be adjusted.

The OCC receiver may be implemented by a single camera provided in the vehicle in the present embodiment, and may include an image sensor, a pixel scanner, a demodulator, and a decoder illustrated in FIG. 2.

That is, the camera including the image sensor may serve as a receiver in the OCC system, and the camera may be a camera that captures images in a rolling shutter manner. Specifically, the camera includes a rolling shutter type image sensor combined with a plurality of rows, and according to a predetermined frame rate, a flashing state of the light source may be continuously captured for each row. To this end, a rolling shutter type image sensor may be provided internally. Each row of the image sensor is exposed sequentially at a regular time interval during a predetermined integration time. The last integration time of the first row and the last integration time of the last row are referred to as a frame time, and the sum of the integration time and the frame time is a capture time. The image captured during this capture time is represented as a white band when the light source is on and represented as a black band when the light source is off. The change of the on/off state of the light source may be sequentially recorded during the capture time. At this time, the white band and the black band may be set to represent, for example, 1 and 0 as data, respectively. As such, the camera may receive multiple data in one frame. As the image sensor, for example, a CMOS sensor may be used. At this time, the camera may start photographing at any point while the light source is turned on or off. In this case, it is necessary to distinguish a start frame and a data frame from the captured image. In addition, in the present embodiment, the frame rate for photographing the on/off image of the light source of the camera is predetermined, but even when the actual frame rate is changed, accurate data reception may be possible.

A pixel scanner may generate a brightness signal according to a brightness value of the on/off image of the light source photographed for each of a plurality of rows in the camera. Specifically, as described above, while the light source is turned on or off according to the data, the white band and the black band are shown, wherein a brightness value of each band may be different. For example, a color exhibited according to the on/off of the light source may be represented as a brightness value of, for example, 0 to 255, wherein the white band may have a brightness value of 255 and the black band may have a brightness value of 0. Naturally, the range of these brightness values may be changed.

Further, the demodulator may detect a bit sequence from the brightness signal of the on/off image of the light source generated by the OCC transmitter, and perform a convolution operation on the generated brightness sequence and an additionally generated reverse sequence to detect the bit sequence.

The decoder may extract the data from the detected bit sequence. This is to restore the data coded in the on/off image of the light source according to the data to be transmitted from the OCC transmitter. For example, when Data 1 to be transmitted from the OCC transmitter is made to correspond to "on" of the light source and Data 0 is made to correspond to "off" of the light source, the decoder may extract 1 from the "on" image of the light source and 0 from the "off" image. At this time, in the present embodiment, an output data sequence may be extracted using a brightness value in the brightness signal of the on/off image of the light source. Specifically, the output data sequence may be extracted by combining slopes of the brightness signal, i.e., the ascending and descending of the brightness signal.

Referring to FIG. 1, the system for determining the vehicle location may be configured to include a vehicle location determination apparatus 100, a user terminal 200, a server 300, and a network 400.

In the present embodiment, users access an application or website implemented in the user terminal 200 to perform a process of confirming a vehicle location determination result and the like. According to the embodiment, the camera of the user terminal 200 may be used as an OCC receiver.

Such a user terminal 200 may receive a service through an authentication process after accessing a vehicle location determination application or a vehicle location determination website. The authentication process may include authentication by inputting user information such as membership registration, authentication on the user terminal, etc., but is not limited thereto, and the authentication process may also be performed only by accessing a link to be transmitted from the vehicle location determination apparatus 100 and/or the server 300.

In the present embodiment, the user terminal 200 may be a user-operable desktop computer, a smartphone, a notebook, a tablet PC, a smart TV, a mobile phone, a personal digital assistant (PDA), a laptop computer, a media player, a micro server, a global positioning system (GPS) device, an E-book terminal, a digital broadcasting terminal, a navigation, a kiosk, an MP3 player, a digital camera, a home appliance, and other mobile or immobile computing devices, but is not limited thereto. Further, the user terminal 200 may be a wearable terminal having a communication function and a data processing function, such as a watch, glasses, a hair band, or a ring. The user terminal 200 is not limited to the aforementioned contents, and any web-browsing terminal may be applied without limitation.

In the present embodiment, the vehicle location determination system may be implemented by the vehicle location determination apparatus 100 and/or the server 300, wherein the server 300 may be a server for operating the vehicle location determination system including the vehicle location determination apparatus 100. In addition, the server 300 may be a database server that provides data that causes operation of the vehicle location determination apparatus 100. In addition, the server 300 may include a web server or application server that allows the vehicle location determination system 1 to be implemented, and may include the aforementioned servers or network with these servers.

The network 400 may serve to connect the vehicle location determination apparatus 100, the server 300, and the user terminal 200 in the vehicle location determination system. The network 400 may include wired networks, such as local area networks (LANs), wide area networks (WANs), metropolitan area networks (MANs), and integrated service digital networks (ISDNs), or wireless networks such as wireless LANs, CDMA, Bluetooth, and satellite communication, but the scope of the present disclosure is not limited thereto.

Further, the network 400 may transmit/receive information using short-range communication and/or long-distance communication. Here, the short-range communication may include Bluetooth, radio frequency identification (RFID), infrared data association (IrDA), ultra-wideband (UWB), ZigBee, and wireless fidelity (Wi-Fi) technologies. The long-range communication may include code division multiple access (CDMA), frequency division multiple access (FDMA), time division multiple access (TDMA), orthogonal frequency division multiple access (OFDMA), and single carrier frequency division multiple access (SC-FDMA) technologies.

The network 400 may include a connection of network elements such as hubs, bridges, routers, switches, and gateways. The network 400 may include one or more connected networks, for example, a multi-network environment, including a public network such as Internet and a private network such as a safe corporate private network. Access to the network 400 may be provided via one or more wired or wireless access networks. Furthermore, the network 400 may support an Internet of things (IoT) network and/or 5G communication for exchanging and processing information between distributed components such as objects.

FIG. 3 is a diagram schematically illustrating a change in size of a rear lamp of a front vehicle according to a distance between the vehicles in an apparatus for determining a vehicle location according to an embodiment of the present disclosure, FIG. 4 is a block diagram schematically illustrating an apparatus for determining a vehicle location according to an embodiment of the present disclosure, and FIG. 5 is an exemplary diagram for describing an apparatus for determining a vehicle location according to an embodiment of the present disclosure.

In addition, FIG. 6 is an exemplary diagram for describing coordination setting in the apparatus for determining the vehicle location according to an embodiment of the present disclosure, FIG. 7 is an exemplary diagram for describing a process of deriving location information in the apparatus for determining the vehicle location according to an embodiment of the present disclosure, and FIG. 8 is an exemplary diagram illustrating shapes of rear lamps of the front vehicle of the apparatus for determining the vehicle location according to an embodiment of the present disclosure.

FIG. 3 illustrates a change in size of the rear lamp of the front vehicle according to a distance between the vehicles, and FIG. 3A illustrates that a distance between a single camera of an ego vehicle and a plurality of rear lamps of the front vehicle is $d_a$, and at this time, a distance between the plurality of rear lamps is $L_{lr}^{a}$. In addition, FIG. 3B illustrates that a distance between a single camera of an ego vehicle and a plurality of rear lamps of the front vehicle is $d_b$, and a distance between the plurality of rear lamps is $L_{lr}^{b}$. In addition, FIG. 3C illustrates that a distance between a single camera of an ego vehicle and a plurality of rear lamps of the front vehicle is $d_c$, and a distance between the plurality of rear lamps is $L_{lr}^{c}$.

As illustrated in FIG. 3, it can be seen that the closer the distance between the vehicle and the front vehicle, the larger the size of the rear lamp of the front vehicle photographed by the single camera of the vehicle, and the farther the distance between the vehicle and the front vehicle, the smaller the size of the rear lamp of the front vehicle photographed by the single camera of the vehicle. In addition, it can be seen that not only does the size of the rear lamp vary, but the distance between the rear lamps also varies. That is, the closer the distance between the vehicle and the front vehicle, the longer the distance between the rear lamps, and the farther the distance between the vehicle and the front vehicle, the shorter the distance between the rear lamps.

Accordingly, FIG. 3A illustrates a state in which the distance from the front vehicle is relatively shortest and the distance between the rear lamps of the front vehicle is longest, wherein it can be seen that the distance between the ego vehicle and the front vehicle is minimum. In addition, FIG. 3C illustrates a state in which the distance from the front vehicle is relatively longest and the distance between the rear lamps of the front vehicle is shortest, wherein it can be seen that the distance between the ego vehicle and the front vehicle is far. In other words, in FIG. 3B, it can be seen that the distance from the front vehicle and the distance between the rear lamps of the front vehicle are intermediate, and the ego vehicle and the front vehicle are at a safe distance from each other.

That is, in the present embodiment, the location of the front vehicle may be determined by using the distance between the plurality of rear lamps of the front vehicles and the size of the rear lamp as described above. More detailed description will follow below;

As illustrated in FIG. 4, the vehicle location determination apparatus 100 may include a single camera 110, a processor 120, a memory 130, and a user interface 140.

The single camera 110 may refer to a camera and/or an image sensor provided in the vehicle. The image sensor may be provided in the camera, or may be configured separately. At this time, a plurality of cameras may be provided in the vehicle, but since the single camera receives OCC-based data from the rear lamps of the front vehicle, in the present embodiment, the single camera is described. Also, when the plurality of cameras are provided in the vehicle, the single camera is not fixed to a camera and may be changed according to a setting.

Further, the installation position of the single camera 110 is not limited, and the single camera 110 may be installed at a position at which it is easy to photograph a front side of the vehicle, and in accordance with an embodiment, the camera of the user terminal 200 may be implemented as a single camera.

The single camera 110 of the present embodiment may include an information reception unit 111 and an image acquisition unit 112. The information reception unit 111 may receive the OCC-based data from the rear lamps of the front vehicle, and the image acquisition unit 112 may acquire an image in a field of view (FOV) of the single camera 110 including the front side of the vehicle. The FOV is a range in which the single camera 110 can acquire an image, and may be a range in which a signal can be recognized. Further, in the present embodiment, the information reception unit 111 may receive data from the plurality of rear lamps of the front vehicle in a rolling shutter manner.

The memory 130 may store various types of information required for the operation of the vehicle location determination apparatus 100, and control software capable of causing operation of the vehicle location determination apparatus 100, and may include volatile or nonvolatile recording media.

The memory 130 is connected to one or more processors 120, and may store codes that, when executed by the one or more processors 120, cause the one or more processors 120 to control the vehicle location determination apparatus 100.

Here, the memory 130 may include magnetic storage media or flash storage media, but the scope of the present disclosure is not limited thereto. Such a memory 130 may include an internal memory and/or an external memory, and may include a volatile memory such as a DRAM, SRAM, or SDRAM, a non-volatile memory such as one time programmable ROM (OTPROM), PROM, EPROM, EEPROM, mask ROM, flash ROM, NAND flash memory, or NOR flash memory, and a storage device such as an HDD or a flash drive such as an SSD, compact flash (CF) card, SD card, micro-SD card, mini-SD card, Xd card, or a memory stick.

The user interface 140 may include an input interface to which a user request and instructions for determining a vehicle location are inputted. Further, in the present embodiment, the user interface 140 may be, for example, an input interface to which requests and instructions, such as providing location information of the front vehicle to rear or peripheral vehicles after determining the location of the front vehicle, are inputted.

In addition, the user interface 140 may include an output interface for outputting a vehicle location determination result in the vehicle location determination apparatus 100, a notification (or warning) message according to the vehicle location determination, or the like.

The input interface and the output interface of the user interface 140 may be implemented in the same interface, and for example, the user interface may be implemented by a display device such as an AVN system in the vehicle or an application and/or website driven in the user terminal 200.

The processor 120 may control the overall operation of the vehicle location determination apparatus 100. Specifically, the processor 120 is connected to the components of the vehicle location determination apparatus 100 including the memory 130, and may control the operation of the vehicle location determination apparatus 100 as a whole by executing at least one instruction stored in the memory 130.

The processor 120 may be implemented via various schemes. For example, the processor 120 may be implemented by at least one of an application specific integrated circuit (ASIC), an embedded processor, a microprocessor, a hardware control logic, a hardware finite state machine (FSM), or a digital signal processor (DSP).

The processor 120 may control the entire operation of the vehicle location determination apparatus 100 by driving control software mounted on the memory 130 as a kind of central processing unit. The processor 120 may include all types of devices capable of processing data. Here, "processor" may refer to, for example, a data processing device embedded in hardware, which has a circuitry physically structured to perform a function represented by codes or instructions contained in a program. As such, examples of the data processing device embedded in the hardware may include processing devices such as a microprocessor, a central processing unit (CPU), a processor core, a multiprocessor, an application-specific integrated circuit (ASIC), and a field programmable gate array (FPGA), but the scope of the present disclosure is not limited thereto.

Referring to FIG. 5, in the present embodiment, the processor 120 determines locations of peripheral vehicles based on OCC, and first, may receive information on a distance between the plurality of rear lamps of the front vehicle and size information of the plurality of rear lamps by using the single camera 110 provided in the vehicle. At this time, the vehicles may be divided according to identification information such as an ID. The vehicle ID may be a prerequisite for vehicle location determination and communication based on OCC.

In addition, the processor 120 may acquire a rear side image of the front vehicle through the single camera 110, wherein the rear side image of the front vehicle may have the same meaning as the acquiring of the front side images of the front vehicle. However, according to the embodiment, when a vehicle is detected around the ego vehicle through a separate sensor of the vehicle, an image may also be acquired only for the direction of the corresponding vehicle.

On the other hand, in the present embodiment, the processor 120 may determine a rear lamp area in the rear side image of the front vehicle by using a pre-trained artificial neural network. That is, in the present embodiment, it is possible to accurately identify a region of interest (that is, a rear lamp area) in the input image by using an artificial neural network that is capable of identifying the region of interest. At this time, the processor 120 may determine a rear lamp area in the rear side image of the front vehicle based on a machine learning-based trained model that is trained to identify the rear lamp area of the vehicle using vehicle peripheral images collected from the single camera 110 as an input. Further, in the present embodiment, the artificial neural network may be applied as a convolutional neural network (CNN) model.

At this time, in the present embodiment, since the selected area is not directly related to an object or lower level and upper level features, but depends on an annotation output, the selected area depends on the subjective content of images of a training set from the camera, and there are no common visual or spatial characteristics in the selected area.

In other words, the accuracy of the actually-selected tag is important, and when the annotation output is correct, the region of interest (ROI) is highly likely to be selected correctly. In addition, in the present embodiment, the selected area may be continuous without particular restriction, and since it is shown that a weight is not randomly allocated to an area, the weight is a good approximation of the importance of an area based on a mental model of the vehicle. Here, the mental model may be formed through experience, training, and instruction as a model of the vehicle for a ego vehicle, other vehicles, environments, and objects interacting with the ego vehicle.

The processor 120 may determine the rear lamp area by using the artificial neural network, and then determine a driving lane of the front vehicle based on the rear lamp area. That is, referring to FIG. 6, FIG. 6A illustrates a case where the front vehicle is in a driving lane to the left of the ego vehicle, FIG. 6B illustrates a case where the front vehicle is in the same driving lane as the ego vehicle, and FIG. 6C illustrates a case where the front vehicle is in a driving lane to the right of the ego vehicle. When the front vehicle changes driving lanes, the single camera 110 may change the coordinates of the plurality of rear lamps of the front vehicle.

Further, the processor 120 may determine the distance between the single camera 110 and each of the plurality of rear lamps based on the rear lamp area. In addition, the processor 120 may derive location information of the front vehicle based on the information on the distance between the plurality of rear lamps and the size information received from the plurality of rear lamps of the front vehicle, and the distance between the single camera 110 and each of the plurality of rear lamps, and the driving lane of the front vehicle.

At this time, the processor 120 may determine the distance between the single camera 110 and each of the plurality of rear lamps by using size information of the plurality of rear lamps, the size of the rear lamp area of the rear side image of the front vehicle, and a focal distance of the single camera 110. That is, a distance from the single camera 110 of which a focal distance is f to the plurality of rear lamps may be calculated by using Equation 1.

$$D = f \sqrt{\frac{S_{ij}}{s_{ij}}} \qquad \text{[Equation 1]}$$

Here, $S_{ij}$ means an actual size of the rear lamp area received from the plurality of rear lamps of the front vehicle, and $s_{ij}$ may mean the size of the plurality of rear lamp areas of the rear side image of the front vehicle projected to the single camera 110. That is, a distance from the single camera 110 to a left rear lamp and a distance from the single camera 110 to a right rear lamp may be calculated by using the sizes, respectively.

In addition, FIG. 7 illustrates an example in which the front vehicle is in the driving lane to the right of the ego vehicle, and the method of deriving the location information of the front vehicle will be described with reference to this.

The processor 120 may set, as a reference point a, a point where a straight line in a straight direction of the vehicle from the single camera 110 is perpendicular to a parallel line of the plurality of rear lamps.

In addition, the processor 120 may calculate a straight distance D between the single camera 110 and the reference point a based on the distance between the single camera 110 and each of the plurality of rear lamps, and the received information on the distance between the plurality of rear lamps, on the basis of an equation according to the driving lane of the front vehicle. Here, D represents a different meaning from D in Equation 1, and D in Equation 1 may mean $D_L$ and $D_R$ to be described below.

That is, when a distance between the left rear lamp of the front vehicle and the ego vehicle is $D_L$ and a distance between the right rear lamp of the front vehicle and the ego vehicle is $D_R$, the straight distance D between the single camera 110 and the reference point a may be calculated through Equations 2 to 5. Here, $D_{LR}$ is a distance between the plurality of rear lamps received from the front vehicle using OCC.

$$D_R^2 = (D_{LR} + C)^2 + D^2 \qquad \text{[Equation 2]}$$

$$D_L^2 = C^2 + D^2 \qquad \text{[Equation 3]}$$

$$D_R^2 - D_L^2 = D_{LR}^2 + 2D_{LR}C \qquad \text{[Equation 4]}$$

$$C = \frac{D_R^2 - D_L^2 - D_{LR}^2}{2D_{LR}^2}$$

$$D = \sqrt{D_L^2 - \left(\frac{D_R^2 - D_L^2 - D_{LR}^2}{2D_{LR}}\right)^2} \qquad \text{[Equation 5]}$$

That is, in the present embodiment, the straight distance D between the single camera 110 and the reference point a may be calculated based on the distance between the single camera 110 and the left rear lamp, the distance between the single camera 110 and the right rear lamp, and the information on the distance between the plurality of rear lamps received from the front vehicle.

In addition, in the present embodiment, the straight distance D between the single camera 110 and the reference point a when the front vehicle is in the driving lane to the left of the ego vehicle may be calculated through Equation 6.

$$D = \sqrt{D_R^2 - \left(\frac{D_L^2 - D_R^2 - D_{LR}^2}{2D_{LR}}\right)^2} \qquad \text{[Equation 6]}$$

In addition, in the present embodiment, the straight distance D between the single camera 110 and the reference point a when the front vehicle is in the same driving lane as the ego vehicle may be calculated through Equation 7.

$$D = \sqrt{\frac{(D_L^2 + D_R^2)}{2} - \frac{D_{LR}^2}{4}} \qquad \text{[Equation 7]}$$

In addition, in the present embodiment, the processor 120 may calculate an angular distance between the reference point a and each of the plurality of rear lamps based on the straight distance D between the single camera 110 and the reference point a. That is, the processor 120 may calculate an angular distance $\theta_L$ between the reference point a and the left rear lamp, an angular distance $\theta_R$ between the reference point a and the right rear lamp, and an angular distance $\theta_C$ between the reference point a and a central point of the left and right rear lamps. At this time, the processor 120 may calculate the angular distance between the reference point a and each of the plurality of rear lamps by using a trigonometric ratio equation based on the straight line between the single camera 110 and the reference point a as shown in Equations 8 to 10.

$$\theta_L = \tan^{-1}\left(\frac{C}{D}\right) \qquad \text{[Equation 8]}$$

$$\theta_R = \tan^{-1}\left(\frac{C + D_{LR}}{D}\right) \qquad \text{[Equation 9]}$$

$$\theta_C = \tan^{-1}\left(\frac{C + \frac{D_{LR}}{2}}{D}\right) \qquad \text{[Equation 10]}$$

Meanwhile, the processor 120 may receive at least one of identification information of the front vehicle or state information of the front vehicle from the plurality of rear lamps of the front vehicle using the single camera 110. That is, the processor 120 may receive identification information capable of identifying the front vehicle so as to determine the location of the corresponding vehicle. Further, in the present embodiment, the state information of the front vehicle may be received through OCC, and the state information may include information on a case where there is a problem in the front vehicle, a driving situation, or the like.

Further, the processor 120 may simultaneously receive, using the single camera 110, the identification information of the front vehicle and the state information of the front vehicle, the information on the distance between the plurality of rear lamps of the front vehicle, and the size information of the plurality of rear lamps from the plurality of rear lamps of the front vehicle. That is, the processor 120 may simultaneously receive the pieces of information by only capturing the plurality of rear lamps based on OCC.

In addition, the processor 120 may transmit at least one of first information received from the front vehicle, second information determined from the ego vehicle, or third information on rear lamps of the ego vehicle through the rear lamps of the ego vehicle. At this time, the first information includes the identification information of the front vehicle and the state information of the front vehicle, the second information includes the location information of the front vehicle, the identification information of the ego vehicle, and the state information of the ego vehicle, and the third information may include the information on the distance between the plurality of rear lamps of the ego vehicle and the size information of the plurality of rear lamps of the ego vehicle. That is, in the present embodiment, the processor 120 may receive data from the front vehicle, and transmit the data to a rear vehicle according to a situation through OCC.

Meanwhile, after the processor 120 determines the rear lamp area of the rear side image of the front vehicle acquired through the single camera 110, the processor 120 may then calculate a change value of the distance between the plurality of rear lamps of the rear lamp area over the driving time. In addition, the processor 120 may calculate a relative speed or a relative distance between the ego vehicle and the front vehicle based on the change value of the distance between the plurality of rear lamps, and determine a collision position of the front vehicle based on the calculated relative speed or relative distance.

However, in the present embodiment, since the processor 120 may calculate a distance between the front vehicle and the ego vehicle, that is, a relative distance based on the data received from the plurality of rear lamps of the front vehicle, the processor 120 may periodically calculate a change value of a straight distance between the single camera 110 and the reference point over the driving time, and calculate a relative speed between the ego vehicle and the front vehicle based on the change value of the straight distance. In addition, the processor may determine a collision possibility of the front vehicle based on the calculated relative speed.

In summary, as illustrated in FIG. 8, an image of the plurality of rear lamp areas of the front vehicle may be acquired through the single camera 110. FIG. 8 illustrates shapes of rear lamps when the front vehicle is parallel with the single camera 110, wherein FIG. 8A illustrates an image acquired from the single camera 110 and FIG. 8B illustrates an image in which a rear lamp area is detected in the acquired image. In addition, FIG. 8C illustrates a binary image of the detected rear lamp area and FIG. 8D illustrates an image of a right rear lamp modified due to a rolling shutter effect of the single camera 110.

Accordingly, in the present embodiment, based on OCC, the single camera 110 of the vehicle may receive the data from the plurality of rear lamps of the front vehicle, and determine vehicle location information, such as the distance from the front vehicle and the like, through the received data.

FIG. 9 is a flowchart for describing a method for determining a vehicle location according to an embodiment of the present disclosure. In the following description, the description of duplicated parts with the description of FIGS. 1 to 8 will be omitted.

As illustrated in FIG. 9, in step S100, the vehicle location determination apparatus 100 receives information on the distance between the plurality of rear lamps of the front vehicle and size information of the plurality of rear lamps by using the single camera 110 provided in the vehicle.

Here, the single camera 110 may refer to a camera and/or an image sensor provided in the vehicle. The image sensor may be provided in the camera, or may be configured separately. In addition, the single camera 110 of the embodiment may receive optical camera communication (OCC)-based data from the rear lamps of the front vehicle, and receive data from a plurality of rear lamps of the front vehicle in a rolling shutter manner.

In step S200, the vehicle location determination apparatus 100 acquires a rear side image of the front vehicle through the single camera 110.

At this time, the vehicle location determination apparatus 100 may acquire an image in a field of view (FOV) of the single camera 110 including the front side of the vehicle. The FOV is a range in which the single camera 110 can acquire an image, and may be a range in which a signal can be recognized.

In addition, in step S300, the vehicle location determination apparatus 100 determines a rear lamp area in the rear side image of the front vehicle by using a pre-trained artificial neural network.

That is, in the present embodiment, it is possible to accurately identify a region of interest (that is, a rear lamp area) in the input image by using an artificial neural network that is capable of identifying the region of interest. At this time, the vehicle location determination apparatus 100 may determine a rear lamp area in the rear side image of the front vehicle based on a machine learning-based trained model that is trained to identify the rear lamp area of the vehicle using vehicle peripheral images collected from the single camera 110 as an input. Further, in the present embodiment, the artificial neural network may be applied as a convolutional neural network (CNN) model.

In step S400, the vehicle location determination apparatus 100 determines a driving lane of the front vehicle based on the rear lamp area.

That is, the vehicle location determination apparatus 100 may determine the rear lamp area by using an artificial neural network and then determine a driving lane of the front vehicle based on the rear lamp area, and may change the coordinates of the plurality of rear lamps of the front vehicle of the single camera 110 when the front vehicle changes driving lanes.

In step S500, the vehicle location determination apparatus 100 determines a distance between the single camera 110 and each of the plurality of rear lamps based on the rear lamp area. In step S600, the vehicle location determination apparatus 100 derives location information of the front vehicle based on the received information on the distance between the plurality of rear lamps, the size information, the distance between the single camera 110 and each of the plurality of rear lamps, and the driving lane.

At this time, the vehicle location determination apparatus 100 may determine the distance between the single camera 110 and each of the plurality of rear lamps by using the size information of the plurality of rear lamps, the size of the rear lamp area of the rear side image of the front vehicle, and a focal distance of the single camera 110. That is, a distance from the single camera 110 of which a focal distance is f to the plurality of rear lamps may be calculated by using Equation 1, and a distance from the single camera 110 to a left rear lamp and a distance from the single camera 110 to a right rear lamp may be calculated, respectively.

In addition, the vehicle location determination apparatus 100 may set, as a reference point a, a point where a straight line in a straight direction of the vehicle from the single camera 110 is perpendicular to a parallel line of the plurality of rear lamps. Thereafter, the vehicle location determination apparatus 100 may calculate a straight distance D between the single camera 110 and the reference point a based on the distance between the single camera 110 and each of the plurality of rear lamps, and the received information on the distance between the plurality of rear lamps, on the basis of an equation according to the driving lane of the front vehicle. Here, D represents a different meaning from D in Equation 1, and D in Equation 1 may mean $D_L$ and $D_R$ to be described below.

That is, when a distance between the left rear lamp of the front vehicle and the ego vehicle is $D_L$ and a distance between the right rear lamp of the front vehicle and the ego vehicle is $D_R$, the straight distance D between the single camera 110 and the reference point a may be calculated through Equations 2 to 5.

That is, in the present embodiment, the straight distance D between the single camera 110 and the reference point a may be calculated based on the distance between the single camera 110 and the left rear lamp, the distance between the single camera 110 and the right rear lamp, and the information on the distance between the plurality of rear lamps received from the front vehicle.

In addition, in the present embodiment, the vehicle location determination apparatus 100 may calculate an angular distance between the reference point a and each of the plurality of rear lamps based on the straight distance D between the single camera 110 and the reference point a. That is, the vehicle location determination apparatus 100 may calculate the angular distance between the reference point a and each of the plurality of rear lamps by using a trigonometric ratio equation based on the straight line between the single camera 110 and the reference point a as shown in Equations 8 to 10.

Accordingly, in the present embodiment, the vehicle location determination apparatus 100 performs vehicle location determination and communication based on OCC for the front vehicle from which identification information is received, and accurately detects the rear lamp area of the front vehicle by using the artificial neural network, thereby more accurately determining location information (the distance and the angular distance) from the front vehicle.

The embodiments according to the present disclosure described above may be implemented in the form of computer programs executable through various components on a computer, and these computer programs may be recorded in computer-readable media. The media may include magnetic media such as a hard disk, a floppy disk, and a magnetic tape: optical media such as a CD-ROM and a DVD; magneto-optical media such as a floptical disk; and hardware devices that are specially configured to store and execute program instructions, such as a ROM, a RAM, and a flash memory.

Meanwhile, the computer programs may be those specially designed and configured for the present disclosure or may be those well-known and available to those skilled in a computer software field. Examples of the computer programs may include both machine codes, such as produced by a compiler, and higher-level codes that may be executed by the computer using an interpreter and the like.

As used in the present disclosure (especially, in the appended claims), the use of the term "the" and indicative terms similar thereto may correspond to both singular and plural references. Also, in the present disclosure, when a range is described, inventions applied with individual values belonging to the above range are included (unless expressly indicated otherwise), and therefore, each individual value constituting the range will be included in the detailed description of the invention.

Also, if the order of the steps constituting the method according to the present disclosure is clearly described or unless expressly indicated otherwise, the steps may be performed in any suitable order, unless expressly indicated otherwise. The present disclosure is not necessarily limited according to the described order of the steps. All examples described herein or the illustrative terms thereof ("for example", etc.) used herein are merely to describe the present disclosure in greater detail. Therefore, it should be understood that the scope of the present disclosure is not limited to the examples or illustrative terms described above unless limited by the appended claims. Also, it should be apparent to those skilled in the art that various modifications, combinations, and alternations may be configured depending on design conditions and factors within the scope of the appended claims or equivalents thereof.

The present invention was made with Korean Government support under Project Identification No. 1711116158 and Project No. 2018-0-01396-003 awarded by the Korean Ministry of Science and ICT.

The present disclosure described as above is not limited by the aspects described herein and the accompanying drawings. It should be apparent to those skilled in the art that various substitutions, changes and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

What is claimed is:

1. A method for determining locations of peripheral vehicles based on optical camera communication (OCC), the method comprising:

receiving OCC-based information transmitted by a plurality of rear lamps of a front vehicle, the OCC-based information including a distance between a plurality of rear lamps of the front vehicle and size information of the plurality of rear lamps, the receiving of the OCC-based information using a single camera provided in an ego vehicle;

acquiring a rear side image of the front vehicle by using the single camera;

determining a rear lamp area image in the rear side image of the front vehicle by using a pre-trained artificial neural network model that is trained to identify a rear lamp area of the front vehicle using vehicle peripheral images collected from the single camera;

determining a driving lane of the front vehicle based on a location of the rear lamp area image in the rear side image of the front vehicle by using a processor;

determining a distance between the single camera of the ego vehicle and each of the plurality of rear lamps in the front vehicle based on the rear lamp area image of the front vehicle by using the processor; and deriving location information of the front vehicle based on the received OCC-based information on the distance between the plurality of rear lamps, the size information, the distance between the single camera and each of the plurality of rear lamps, and the driving lane by using the processor, wherein the determining of the distance between the single camera and each of the plurality of rear lamps comprises determining the distance between the single camera and each of the plurality of rear lamps by using the size information of the plurality of rear lamps, a size of the rear lamp area image in the rear side image, and a focal distance of the single camera, and wherein the deriving of the location information of the front vehicle comprises:

setting, as a reference point, a point where a straight line in a straight direction of the ego vehicle from the single camera is perpendicular to a parallel line of the plurality of rear lamps;

according to the determined driving lane, calculating a straight distance between the single camera and the reference point based on the distance between the single camera and each of the plurality of rear lamps, and the received OCC-based information on the distance between the plurality of rear lamps; and calculating an angular distance between the reference point and each of the plurality of rear lamps based on the straight distance between the single camera and the reference point.

2. The method of claim 1, wherein the calculating of the angular distance comprises calculating the angular distance between the reference point and each of the plurality of rear lamps by using a trigonometric ratio equation based on the straight distance between the single camera and the reference point.

3. The method of claim 1, wherein the determining of the rear lamp area image in the rear side image of the front vehicle by using the pre-trained artificial neural network model comprises determining the rear lamp area image in the rear side image of the front vehicle based on a machine learning-based trained model that is trained to identify the rear lamp area image of the front vehicle using vehicle peripheral images collected from the single camera as an input.

4. The method of claim 1, further comprising receiving, using the single camera, at least one of identification information of the front vehicle or state information of the front vehicle from the plurality of rear lamps of the front vehicle.

5. The method of claim 1, further comprising simultaneously receiving, using the single camera, identification information of the front vehicle and state information of the front vehicle, the OCC-based information on the distance between the plurality of rear lamps of the front vehicle, and the size information of the plurality of rear lamps from the plurality of rear lamps of the front vehicle.

6. The method of claim 1, wherein the receiving of the OCC-based information comprises receiving data from the plurality of rear lamps of the front vehicle in a rolling shutter manner through the single camera.

7. The method of claim 1, further comprising:

transmitting, through rear lamps of the ego vehicle, at least one of first information received from the front vehicle, second information determined from the ego vehicle, or third information on the rear lamps of the ego vehicle, wherein the first information includes identification information of the front vehicle and state information of the front vehicle, the second information includes the location information of the front vehicle, identification information of the ego vehicle, and state information of the ego vehicle, and the third information includes information on the distance between the plurality of rear lamps of the ego vehicle and size information of the plurality of rear lamps of the ego vehicle.

8. The method of claim 1, further comprising:

determining the rear lamp area image in the rear side image of the front vehicle acquired through the single camera, and then calculating a change value of the distance between the plurality of rear lamps of the rear lamp area over a driving time;

calculating a relative speed or a relative distance between the ego vehicle and the front vehicle based on the change value of the distance between the plurality of rear lamps; and determining a collision possibility of the front vehicle based on the calculated relative speed or relative distance.

9. The method of claim 1, further comprising:

periodically calculating a change value of the straight distance between the single camera and the reference point over a driving time;

calculating a relative speed between the ego vehicle and the front vehicle based on the change value of the straight distance; and determining a collision possibility with the front vehicle based on the calculated relative speed.

10. An apparatus for determining locations of peripheral vehicles based on optical camera communication (OCC), the apparatus comprising:

a memory; and at least one processor connected to the memory and configured to execute computer-readable instructions included in the memory, wherein the at least one processor is configured to perform operations of:

receipt of OCC-based information transmitted by a plurality of rear lamps of a front vehicle, the OCC-based information including a distance between a plurality of rear lamps of a front vehicle and size information of the plurality of rear lamps, the receipt of the OCC-based information using a single camera provided in an ego vehicle;

acquisition of a rear side image of the front vehicle by using the single camera;

determination of a rear lamp area image in the rear side image of the front vehicle by use of a pre-trained artificial neural network model that is trained to identify a rear lamp area of the front vehicle by use of vehicle peripheral images collected from the single camera;

determination of a driving lane of the front vehicle based on a location of the rear lamp area image in the rear side image of the front vehicle;

determination of a distance between the single camera of the ego vehicle and each of the plurality of rear lamps in the front vehicle based on the rear lamp area image of the front vehicle; and derivation of location information of the front vehicle based on the received OCC-based information on the distance between the plurality of rear lamps, the size information, the distance between the single camera and each of the plurality of rear lamps, and the driving lane, wherein the determination of the distance between the single camera and each of the plurality of rear lamps comprises determination of the distance between the single camera and each of the plurality of rear lamps by using the size information of the plurality of rear lamps, a size of the rear lamp area in the rear side image, and a focal distance of the single camera, and wherein the derivation of the location information of the front vehicle comprises:

determination, as a reference point, a point where a straight line in a straight direction of the front vehicle from the single camera is perpendicular to a parallel line of the plurality of rear lamps;

according to the determined driving lane, calculation of a straight distance between the single camera and the reference point based on the distance between the single camera and each of the plurality of rear lamps, and the received OCC-based information on the distance between the plurality of rear lamps; and calculation of an angular distance between the reference point and each of the plurality of rear lamps based on the straight distance between the single camera and the reference point.

11. The apparatus of claim 9, wherein the calculation of the angular distance comprises an operation of calculation of the angular distance between the reference point and each of the plurality of rear lamps by using a trigonometric ratio equation based on the straight distance between the single camera and the reference point.

12. The apparatus of claim 10, wherein the rear lamp area image in the rear side image of the front vehicle by using the pre-trained artificial neural network model comprises an operation of determining the rear lamp area image in the rear side image of the front vehicle based on a machine learning-based trained model that is trained to identify the rear lamp area image of the front vehicle by use of vehicle peripheral images collected from the single camera as an input.

13. The apparatus of claim 10, wherein the apparatus is further configured to receive, using the single camera, at least one of identification information of the front vehicle or state information of the front vehicle from the plurality of rear lamps of the front vehicle.

14. The apparatus of claim 10, wherein the apparatus is further configured to simultaneously receive, using the single camera, identification information of the front vehicle and state information of the front vehicle, the OCC-based information on the distance between the plurality of rear lamps of the front vehicle, and the size information of the plurality of rear lamps from the plurality of rear lamps of the front vehicle.

15. The apparatus of claim 10, wherein the apparatus is further configured to transmit, through rear lamps of the ego vehicle, at least one of first information received from the front vehicle, second information determined from the ego vehicle, or third information on the rear lamps of the ego vehicle, wherein the first information includes identification information of the front vehicle and state information of the front vehicle, the second information includes the location information of the front vehicle, identification information of the ego vehicle, and state information of the ego vehicle, and the third information includes information on the distance between the plurality of rear lamps of the ego vehicle and size information of the plurality of rear lamps of the ego vehicle.

16. The apparatus of claim 10, wherein the apparatus is further configured to determine the rear lamp area image in the rear side image of the front vehicle acquired through the single camera, and then calculate a change value of the distance between the plurality of rear lamps of the rear lamp area over a driving time, calculate a relative speed or a relative distance between the ego vehicle and the front vehicle based on the change value of the distance between the plurality of rear lamps, and determine a collision possibility of the front vehicle based on the calculated relative speed or relative distance.

* * * * *